May 24, 1949. P. J. BROWNSCOMBE 2,470,844
COMBINED PHOTOGRAPHIC COPYING STAND AND APPARATUS
Filed Oct. 21, 1946 2 Sheets-Sheet 2
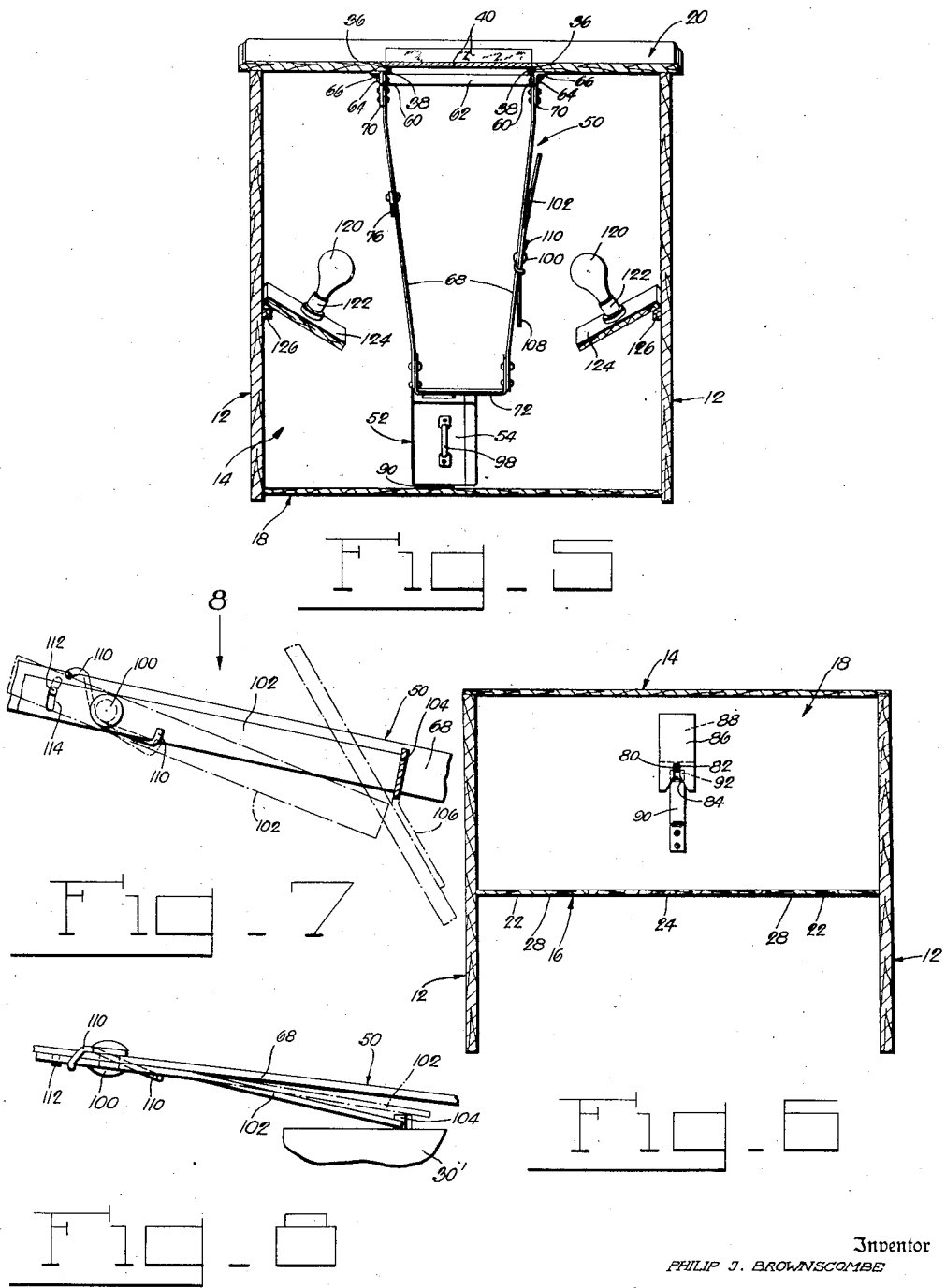
Inventor
PHILIP J. BROWNSCOMBE
By Edwin Lewis
Attorney Patented May 24, 1949

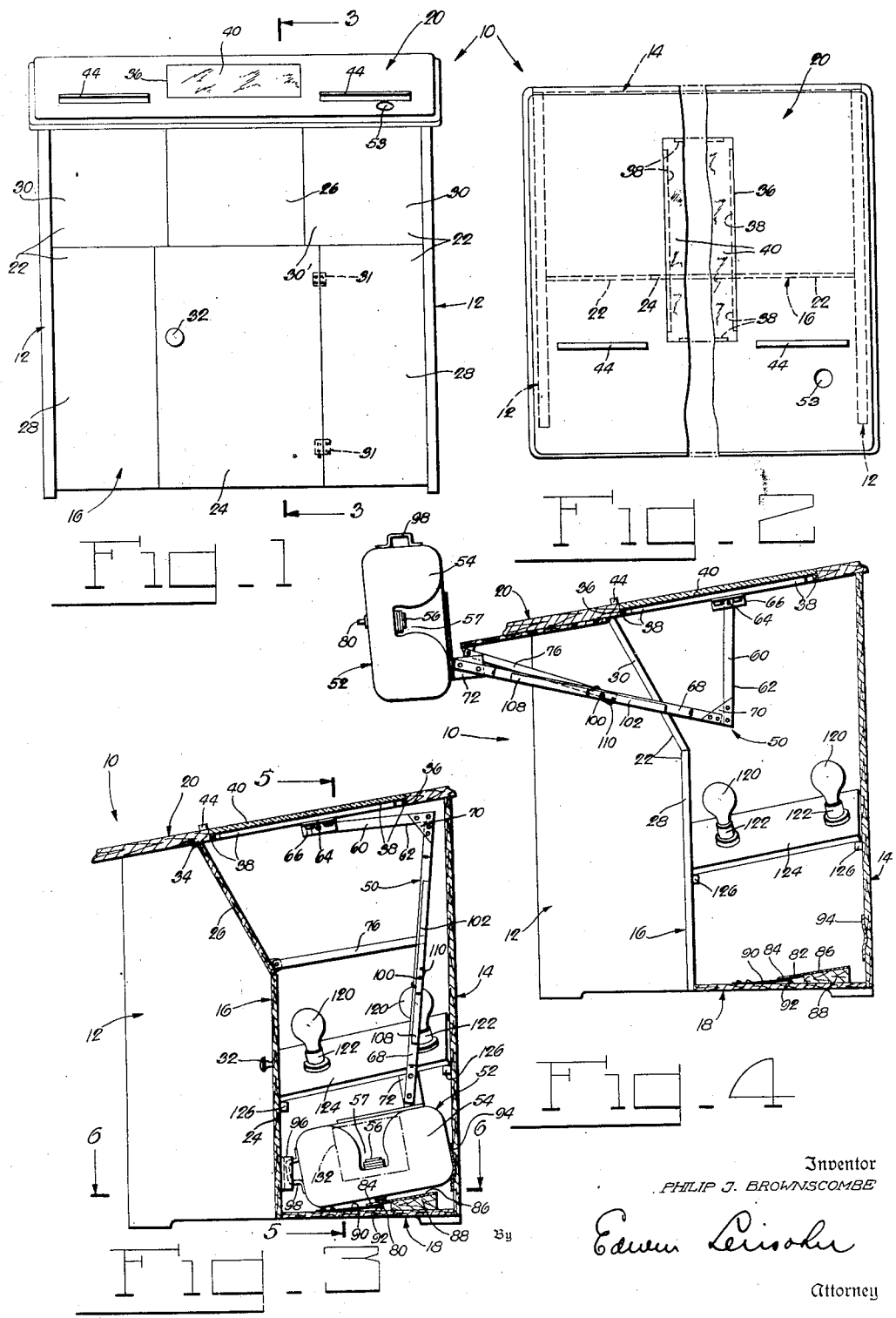

2,470,844

UNITED STATES PATENT OFFICE 2,470,844

COMBINED PHOTOGRAPHIC COPYING STAND AND APPARATUS

Philip J. Brownscombe, Chatham, N. J., assignor to Griscombe Corporation, Newark, N. J., a corporation Application October 21, 1946, Serial No. 704,777

9 Claims. (Cl. 88—24)

This invention relates to copy reproduction stands, and more particularly to a stand for photographic reproduction of printed or like matter.

It is the primary aim and object of the present invention to provide a copy reproduction stand on which printed or like copies may conveniently and instantaneously be reproduced on a photographic plate or film in a camera, and which is equally well suited for highly efficient reproduction of a single copy or of a large quantity of different copies.

It is another important object of the present invention to embody a stand of this type in a desk-like cabinet, on the flat top of which a copy or copies are placed for reproduction, and in the interior of which a reproduction camera is mounted, so that an operator may comfortably be seated in front of the cabinet for the reproduction of copies, or the stand may, when not used for reproduction purposes, be used as a desk or general utility table.

It is another important object of the present invention to facilitate the loading and unloading of the camera, to the end that an attendant is not compelled to stoop and perform his task in the cabinet, but may do it while being comfortably seated and with the ordinary light in the room in which the cabinet stands.

The above and other objects, features and advantages of the present invention will be more fully understood from the following description considered in connection with the accompanying illustrative drawings.

In the drawings:

Fig. 1 is a front elevational view of a copy reproduction stand embodying the present invention;

Fig. 2 is a plan view of the same stand;

Fig. 3 is a section through the stand, taken substantially on the line 3—3 of Fig. 1 and showing the camera in operational position;

Fig. 4 is a section similar to Fig. 3, showing the camera in loading position, however;

Fig. 5 is a section through the stand, taken substantially on the line 5—5 of Fig. 3;

Fig. 6 is a section taken substantially on the line 6—6 of Fig. 3;

Fig. 7 is an enlarged, fragmentary view of a part of the camera support when the camera is in the loading position shown in Fig. 4; and Fig. 8 shows the same part of the camera support as viewed in the direction of the arrow 8 in Fig. 7.

Referring to the drawings, and particularly to Figs. 1 to 4 thereof, the reference numeral 10 designates a copy reproduction stand which, in its appearance and also in its dimensions, preferably resembles a flat-top desk more or less. The stand 10 comprises, in the present instance, opposite side walls 12, a back wall 14, a front wall 16, a bottom wall 18 and a top wall 20. The various walls may be made from wood or any other suitable material. The front wall 16 comprises fixed opposite panels 22, an intermediate hinged door 24 and an intermediate swinging gate 26. Each panel 22 consists of an upright section 28 with which the door 24 is coplanar when closed, and an inclined section 30 with which the gate 26 is coplanar when closed. The door 24 is suitably hinged at 31 to one of the upright sections 28, and is suitably latched in its closed position in any conventional manner (not shown), there being a knob 32 on the door 24 to open and close the latter. The gate 26 is pivoted at 34 on the top 20 for swinging movement into the closed and open positions shown in Figs. 3 and 4, respectively. The top 20 of the stand, which may be inclined in the fashion shown in Figs. 3 and 4, is provided with a preferably rectangular aperture 36 in which are mounted gibs 38 for the support of a transparent plate 40 which fits into the aperture 36. The plate 40 may be of any transparent material such as glass, for instance, and serves as a support for a copy or copies to be reproduced by a camera to be described.

The present stand is adapted for reproducing a copy or copies of any description, such as correspondence, books and printed matter in general, pictures, etc. As best shown in Fig. 1, the transparent plate or "copy support" 40 is arranged substantially in the middle of the top 20, leaving to the left and right of said copy support spaces for copies to be reproduced and for copies that have been reproduced, respectively. In order to prevent any copy or stacked copies from sliding off the inclined top 20, the latter may be provided with suitable holding ledges 44.

Mounted on a hanger 50 in the stand 10 is a camera 52 which may be of any conventional type suitable for the reproduction purpose in mind. The camera 52 preferably holds a large supply of photographic film on a removable reel so as to afford a great number of successive exposures before the camera requires re-loading. The camera is preferably electrically operated in any suitable manner and will take successive exposures on successive portions of the film on successive depressions by an attendant of a push button 53 (Fig. 1) which is provided for that purpose in the top 20 of the stand. The camera, which is in close proximity to the bottom wall 18 of the stand when in the recording position shown in Fig. 3, is provided on the camera casing 54 with a lens assembly 56 which is located at the bottom of an external recess 57 on one side of said camera casing (Fig. 3). By placing the camera in close proximity to the bottom wall 18 when in its recording position, and by arranging the lens assembly 56 on the camera casing 54 as specified, the lens assembly is at a maximum distance from the transparent copy support 40, thus reducing the angle of view of the lens of the camera, within which the entire area of the copy support lies, to a minimum and thereby reducing lens aberration to a minimum, without raising the top 20 of the stand beyond that of a comfortable writing desk. In this way, excellent reproductions may be made of any copy or copies even if occupying the entire area of the transparent copy support 40, while an attendant may be comfortably seated in front of the stand for the reproduction of a copy or copies.

The hanger 50 is suspended from the top 20 of the stand, and carries the camera at its lower end in close proximity to the bottom wall 18. The hanger 50 is, furthermore, so constructed as to be out of the angle of view of the camera. To this end, the hanger is constructed in the form of an inverted L when viewed from the side as in Fig. 3, the short arm thereof being formed by the spaced legs 60 of a U-shaped member 62 which are pivotally mounted at 64 on angle brackets 66 on the inner face of the top 20 and on opposite sides of the copy support 40 (Fig. 5). The long leg of the inverted L-hanger 50 is formed by spaced bars 68 (Fig. 5) which are riveted or otherwise secured at one end to the U-shaped member 62, preferably through intermediation of gussets 70, and are joined at their other ends by a cross-tie 72 on which the camera 52 is mounted in any suitable way. The construction of the hanger 50 and its pivotal mounting on the top of the stand are such that the hanger is completely outside the angle of view of the camera 52.

The hanger 50 and the mounted camera 52 thereon are swingable into the "operative" position shown in Fig. 3 in which the camera is focussed on the copy support 40, and also into the "loading" position shown in Fig. 4 which the camera assumes for loading and unloading purposes. In order to swing the hanger and camera into either one of these positions, the door 24 is opened, the gate 26 swinging with the hanger through intermediation of a link 76 which connects them as shown in Figs. 3 and 4. Thus, when the hanger 50 and the camera 52 are swung into the loading position shown in Fig. 4, the gate 26 is swung into the open position shown in the same figure, while the gate 26 is swung into its closed position when the hanger 50 and the camera 52 are swung into the operating position shown in Fig. 3.

Provisions are made accurately to locate the camera 52 in its operative position in the stand (Fig. 3), so that the same will be accurately focussed and oriented on the copy support 40 after each return into operative position. To this end, the camera 52 is provided with a pilot pin 80 (Fig. 3) which, on movement of the former into its operative position, is guided into a narrow locator end 82 of a wedge-shaped notch 84 in a plate 86 (see also Fig. 6) which is suitably mounted on a block 88 on the bottom wall 18 of the stand. Since in the operative position of the hanger 50 and camera 52 their center of gravity is situated to one side of the pivot mountings 64 of said hanger (Fig. 3), provisions are made to prevent their gravitation from operative position. To this end, there is mounted on the bottom wall 18 of the stand a retainer spring 90, the bent end 92 of which engages the pilot pin 80 on the camera when the same is in its operative position. In order to prevent the camera from shaking or vibrating in its operative position, the same is snugly confined between a soft pad 94 of felt or the like, and a felt-lined V-shaped block 96 on the closed door 24. More particularly, the block 96 on the closed door 24 straddles a handle 98 on the camera 52 which serves for swinging the latter and the hanger into either one of the positions shown in Figs. 3 and 4.

In order to hold the hanger 50 and camera 52 in the outwardly extended loading position shown in Fig. 4 for the purpose of removing exposed film from the camera and placing fresh film therein, the hanger 50 pivotally carries at 100 a latch lever 102 (Figs. 4, 5, 6 and 7) which is adapted to cooperate with a projecting lug 104 on a plate 106 which is suitably mounted on the inclined front wall section 30'. The lug 104 projects within the confines of the opening in the front wall 16 of the stand which is normally closed by the gate 26. The latch lever 102 which is preferably made of steel, is sufficiently yielding to ride over the lug 104 (see dot-and-dash line position of latch lever 102 in Fig. 8) and spring into latching engagement therewith as shown in full lines in Fig. 8, when the hanger is swung into loading position. To release the lever 102 from latching engagement with the lug 104, the former is grasped at its handle portion 108 (Figs. 4 and 5) and turned clockwise as viewed in Fig. 7 into the dot-and-dash line position there shown, against the tendency of a torsion spring 110 to return the latch lever 102 to the full line latching position. In order to limit the rocking movement of the latch lever 102 on the hanger 50 to movement between the two positions shown in Fig. 7, the hanger may be provided with a laterally extending pin 112 which projects through an arcuate groove 114 in the latch lever.

Since the stand 10 is closed when in use (Fig. 3), artificial light is resorted to for illuminating the copy or copies to be reproduced on the transparent support 40 for the exposure by the camera. To this end, electric light bulbs 120 are received in sockets 122 on mounting boards 124 on opposite sides of the hanger 50 in the manner shown in Fig. 5. The mounting boards 124 are suitably secured to ledges 126 along the adjacent walls of the stand, and are preferably disposed in the inclined fashion shown in Figs. 3, 4 and 5, so that the copy support 40 receives the concentrated light of the same intensity from all the bulbs. The sockets 122 for the bulbs are suitably wired for connection in any suitable lighting circuit.

Depending on the construction of the lens assembly 56 of the camera 52, the same may or may not require shielding from the light rays emanating from the bulbs 120. Shielding of the lens assembly 56 of the camera from the light rays from the bulbs 120 is desirable under any circumstances, however. To this end, recess 57 in the camera casing 54, in which the lens assembly 56 is located, acts as a light shield for the latter, except in the direction in which the recess 57 is open. The shielding of the lens assembly 56 may readily be completed, however, by simply covering the open side of the recess 57 in the camera casing by a plate 132 shown in dot-and-dash lines in Fig. 3.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. Photocopy apparatus comprising, an upright frame having a bottom and a transparent top, a camera, a hanger pivotally mounted with one end in said frame adjacent the top thereof and carrying said camera at the other end, said hanger being so swingable in a substantially vertical plane into and from said frame that said camera is focussed on said top and is adjacent said bottom when swung into a certain position in said frame, and means in said frame releasably arresting said camera in said certain position.

2. Photocopy apparatus comprising, a cabinet having a transparent top and a hinged panel on one side, a camera, a hanger pivotally mounted with one end in said cabinet and carrying said camera at the other end, said hanger being so swingable through said one side of the cabinet into and from the latter that said camera is focussed on said top when said hanger is swung into a certain position in said cabinet, and means operatively connecting said hanger with said panel so that the latter opens and closes said cabinet when said hanger is swung from and into said certain position, respectively.

3. Photocopy apparatus comprising, an enclosed cabinet having a transparent top and panels defining one side of the cabinet and being individually hinged for opening and closing said side, a camera, a hanger pivotally mounted with one end in said cabinet and carrying said camera at the other end, said hanger being so swingable through said one side of the cabinet into and from the latter that said camera is focussed on said top when said hanger is swung into a certain position in said cabinet, and means operatively connecting said hanger with one of said panels so that the same opens and closes when said hanger is swung from and into said certain position, respectively.

4. Photocopy apparatus comprising, a cabinet of desk-like form having an apertured top, opposite side walls extending substantially to the front edge of said top, and a front wall between said side walls and spaced rearwardly from the front edges of the latter to provide leg space underneath said top, said front wall being outwardly swingable to expose the interior of said cabinet, a transparent plate in the aperture in said top, a camera, and means in said cabinet for mounting said camera for such swinging movement through the front of said cabinet into and from the latter that said camera is focussed on said transparent plate when swung into a certain position within said cabinet.

5. Photocopy apparatus comprising, a cabinet of desk-like form having an apertured top, opposite side walls extending substantially to the front edge of said top, a front wall between said side walls and spaced rearwardly from the front edges of the latter to provide leg space underneath said top, and a bottom wall extending rearwardly from said front wall, said front wall being outwardly swingable to expose the interior of said cabinet, a transparent plate in the aperture in said top, a camera, and means in said cabinet for mounting said camera for swinging movement in a substantially vertical plane through the front of said cabinet into and from the latter, said mounting means being so constructed and arranged and so carrying said camera that the latter is in close proximity to said bottom wall and is focussed on said transparent plate when swung into a certain position within said cabinet, and is adjacent said top when swung completely from said cabinet.

6. Photocopy apparatus comprising, an upright frame having a transparent top, a camera, a hanger carrying said camera at one end and being pivotally mounted with its other end in said frame adjacent the top thereof, said hanger being so swingable in a substantially vertical plane into first and second positions within and without said frame, respectively, that said camera is in said first position of the hanger located underneath, and focussed on, said top, and means in said frame releasably arresting said camera in its focussed position.

7. Photocopy apparatus as set forth in claim 6, in which said hanger is constructed completely outside the angle of view of said camera.

8. Photocopy apparatus as set forth in claim 6, further comprising means in said frame and on said camera cooperating to guide the latter into its focussed position on swinging said hanger into said first position.

9. Photocopy apparatus as set forth in claim 6, further comprising means on said frame and hanger cooperating releasably to lock the latter in said second position.

PHILIP J. BROWNSCOMBE.

REFERENCES CITED

The following references are of record in the file of this patent:

UNITED STATES PATENTS

| Number | Name | Date |
| --- | --- | --- |
| 1,808,836 | Caps | June 9, 1931 |
| 2,001,062 | Grant | May 14, 1935 |
| 2,133,581 | Simmon | Oct. 18, 1938 |
| 2,319,882 | Reagan | May 25, 1943 |